(12) United States Patent
Cagle et al.

(10) Patent No.: US 7,696,262 B2
(45) Date of Patent: Apr. 13, 2010

(54) WETTING AGENT COMBINATIONS FOR INKJET PRINTING

(75) Inventors: Phillip C. Cagle, San Marcos, CA (US); David M. Mahli, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1136 days.

(21) Appl. No.: 11/202,817

(22) Filed: Aug. 12, 2005

(65) Prior Publication Data

US 2006/0007287 A1 Jan. 12, 2006

Related U.S. Application Data

(63) Continuation-in-part of application No. 10/742,109, filed on Dec. 19, 2003.

(51) Int. Cl.
*C09D 11/00* (2006.01)
(52) U.S. Cl. ............................... 523/160; 523/161
(58) Field of Classification Search ................ 523/160, 523/161
See application file for complete search history.

(56) References Cited

U.S. PATENT DOCUMENTS

| | | | |
|---|---|---|---|
| 5,912,280 A | 6/1999 | Anton et al. | |
| 6,087,416 A | 7/2000 | Pearlstine et al. | |
| 6,132,502 A | 10/2000 | Yatake | |
| 6,184,268 B1 | 2/2001 | Nichols et al. | |
| 6,187,086 B1 | 2/2001 | Rehman | |
| 6,455,132 B1 | 9/2002 | Aurenty et al. | |
| 6,548,571 B1 | 4/2003 | Cheng et al. | |
| 6,610,412 B2 | 8/2003 | Ungefung | |
| 6,635,693 B2 | 10/2003 | Wang et al. | |
| 6,899,754 B2 | 5/2005 | Yeh et al. | |
| 2003/0019395 A1 | 1/2003 | Ma et al. | |
| 2005/0036021 A1 | 2/2005 | Ito et al. | |
| 2005/0137283 A1 | 6/2005 | Frese et al. | |
| 2006/0007287 A1 | 1/2006 | Cagle et al. | |

FOREIGN PATENT DOCUMENTS

| | | | |
|---|---|---|---|
| EP | 0882770 A1 | 12/1998 | |
| EP | 1 493 784 A | 1/2005 | |
| EP | 1 544 262 A | 6/2005 | |
| GB | 2105735 A | 3/1983 | |
| WO | WO 03/010249 | * | 2/2003 |

* cited by examiner

*Primary Examiner*—Edward J Cain

(57) ABSTRACT

An inkjet ink includes an ink vehicle including humectant co-solvents and a fluorosurfactant, and a colorant in the vehicle.

33 Claims, No Drawings

WETTING AGENT COMBINATIONS FOR INKJET PRINTING

RELATED APPLICATIONS

The present application is a continuation-in-part of application Ser. No. 10/742,109 titled "Liquid Vehicle Systems for Improving Latex Ink-Jet Ink Frequency Response," filed on Dec. 19, 2003, which application is incorporated by reference herein in its entirety.

BACKGROUND

There are several reasons that ink-jet printing has become a popular way of recording images on various media surfaces, particularly paper. Some of these reasons include low printer noise, capability of high-speed recording, and capability of multi-color recording. Additionally, these advantages can be obtained at a relatively low price to consumers. Although there have been great improvements in ink-jet printing technology over the years, improvements can still be made in many areas.

For example, the results of printing on non-porous materials such as vinyl film is often less than desirable. In order to produce acceptable images on non-porous materials such as vinyl, inkjet inks should wet out the often low surface energy substrate. Consequently, inkjet inks aimed at printing on non-porous materials such as vinyl may exhibit low surface tension properties while having highly dynamic wetting properties, a combination that has proved difficult to attain.

SUMMARY

In one aspect of the present system and method, an inkjet ink includes a base vehicle and a polymeric fluorosurfactant based on perfluorobutane sulfonates.

In another embodiment of the present system and method, an inkjet ink for printing on non-porous materials includes an ink vehicle including humectant co-solvents and a wetting agent, wherein the wetting agent includes glycol ether, 1,2-alkanediols, and between approximately 0.1 and 5.0% fluorosurfactant, and a colorant pigment in the vehicle.

In yet another embodiment, a method for forming an inkjet ink composition includes forming an ink vehicle, wherein the ink vehicle includes humectant co-solvents and a wetting agent, the wetting agent including approximately 0.5% to 15.0% glycol ether, approximately 0.5% to 15.0% 1,2-alkanediols, and between approximately 0.1 and 5.0% fluorosurfactant, introducing a colorant pigment into the ink vehicle, and dispersing a plurality of polymeric particulates in said ink vehicle.

DETAILED DESCRIPTION

The present specification discloses an exemplary inkjet ink formulation configured to enhance the wetting characteristics of the inkjet ink. Consequently, the present exemplary inkjet ink provides improved printing on a number of desired substrates including, but in no way limited to, photo media and non-porous substrates. According to one exemplary embodiment disclosed herein, the present highly wetting formulations include high concentrations of fluorosurfactant in combination with glycol ethers and 1,2-alkanediols. Further details of the present inkjet ink formulation will be provided below.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof. In describing and claiming the present exemplary system and method, the following terminology will be used.

The singular forms "a," "an," and "the" include plural referents unless the context clearly dictates otherwise. Thus, for example, reference to "a pigment" includes reference to one or more of such materials.

As used in the present specification and in the appended claims, the term "liquid vehicle" is defined to include liquid compositions that can be used to carry colorants, including pigments and/or binders to a substrate. Liquid vehicles are well known in the art and a wide variety of liquid vehicle components may be used in accordance with embodiments of the present exemplary system and method. Such liquid vehicles may include a mixture of a variety of different agents, including without limitation, surfactants, solvents, co-solvents, buffers, biocides, viscosity modifiers, sequestering agents, stabilizing agents, and water. Though not liquid per se, the liquid vehicle can also carry other solids, such as polymeric binders, UV curable materials, plasticizers, co-solvents, salts, etc.

As used herein, "pigment" refers to a colorant particle which is substantially insoluble in the liquid vehicle in which it is used. Pigments that can be used include self-dispersed pigments and non self-dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a non self-dispersed pigment that utilizes a separate and unattached dispersing agent (which can be a polymer, an oligomer, or a surfactant, for example) in the liquid vehicle or physically coated on the surface of the pigment.

The term "monomer emulsion" refers to an organic monomer or monomer mix that is emulsified in an aqueous or water phase. Once the organic monomer or monomer mix is polymerized, a latex polymer dispersion is formed.

The term "latex" or "latex dispersion" includes both latex particulates as well as the aqueous medium in which the latex particulates are dispersed. More specifically, a latex is a liquid suspension comprising a liquid (such as water and/or other liquids) and polymeric particulates from 20 nm to 500 nm (preferably from 100 nm to 300 nm) in size, and having a weight average molecular weight from about 10,000 Mw to 2,000,000 Mw (preferably from about 40,000 Mw to 100,000 Mw). Typically, the polymeric particulate can be present in the liquid at from 0.5 wt % to 15 wt %. Such polymeric particulates can comprise a plurality of monomers that are typically randomly polymerized, and can also be crosslinked. When crosslinked, the molecular weight can be even higher than that cited above. Additionally, in one embodiment, the latex component can have a glass transition temperature from about −25° C. to 100° C.

The term "latex particulates" or "latex particles" are the polymeric masses that are dispersed in latex dispersion. The term "acidified latex particulates" refers to neutralized acid groups of latex particulates that can be present at the surface of latex particulates. The acid groups provide the colloidal latex particles with electrostatic stabilization to avoid particle to particle aggregation during a firing event and during storage.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In the following description, for purposes of explanation, numerous specific details are set forth in order to provide a thorough understanding of the present system and method for forming an inkjet ink. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Formulation

In accordance with the present system and method, an inkjet ink for printing on a desired substrate may include, but is in no way limited to, colorants such as pigments and/or dyes and an ink vehicle including humectant cosolvents and wetting agents. As will be illustrated below, the present exemplary inkjet ink is particularly suited for wetting out low energy substrates and is capable of providing good gloss and image quality on nonporous substrates. Further, the exemplary combination of wetting agents and colorants combine to provide inks with excellent wet/dry durability and image quality over a wide range of substrates, porous and nonporous, when printed on a heated printer. Further details of each of the present inkjet ink components will be described in detail below.

Ink Vehicle

According to one exemplary embodiment, the present exemplary ink vehicle includes, but is in no way limited to, a base vehicle primarily including water, humectant co-solvents such as 2-pyrrolidone, and a wetting package.

According to one exemplary embodiment, the present exemplary ink vehicle includes a number of humectant co-solvents configured to provide hydrophilic properties to the resulting ink, while aiding in the dissolution and/or dispersing of ink components. According to one exemplary embodiment, the present ink vehicle may include any number of humectant co-solvents including, but in no way limited to, 2-pyrollidinone, LEG-1, glycerol, diethylene glycol, trimethylolpropane, 1,5-pentanediol, and/or the like.

In addition to the above exemplary specific co-solvents that can be used, classes of co-solvents that can be used include, but are in no way limited to, aliphatic alcohols, aromatic alcohols, diols, glycol ethers, polyglycol ethers, caprolactams, formamides, acetamides, and long chain alcohols. Examples of such compounds include, but are in no way limited to, primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like.

According to one exemplary embodiment, the present exemplary ink vehicle includes between approximately 10% and 70% humectant co-solvents. More particularly, according to one exemplary embodiment, the present exemplary ink vehicle includes between approximately 10% and approximately 35% 2-pyrollidinone.

In addition to the above-mentioned humectant co-solvents, the present exemplary ink vehicle includes a wetting package configured to enhance the wetting of the resulting ink on a desired substrate. According to one exemplary embodiment, the wetting package includes, but is in no way limited to, between approximately 0.1 and 5.0% fluorosurfactant, between approximately 0.5% and 15.0% glycol ether, and between approximately 0.5% and 15.0% 1,2-alkanediols.

More specifically, according to one exemplary embodiment, the wetting package includes between approximately 0.1% and 5.0% fluorosurfactant. According to this exemplary embodiment, the fluorosurfactant is configured to reduce the surface tension of the resulting inkjet ink, while enhancing the wetting properties thereof. As used herein, the fluorosurfactant used in the present exemplary wetting package may include, but is in no way limited to anionic fluorosurfactants, nonionic fluorosurfactants, or combinations of anionic and nonionic fluorosurfactants.

According to one exemplary embodiment, acceptable anionic fluorosurfactants may be incorporated into the present wetting package. Acceptable anionic fluorosurfactants may include, but are in no way limited to, the commercially available Zonyl® line of fluorosurfactants produced by E.I. Dupont de Nemours and Co. such as Zonyl® FSJ and Zonyl® FS-62; the commercially available Masurf FS-710 and Masurf FS-780 produced by the Mason Chemical Company; and commercially available Unidyne NS-1102 produced by Daikin Industries, LTD.

Additionally, nonionic fluorosurfactants may be included in the present exemplary inkjet ink formulation. More specifically, according to one exemplary embodiment, the nonionic fluorosurfactant that may be included in the present exemplary inkjet ink formulation includes, but is in no way limited to, commercially available nonionic fluorosurfactants such as Zonyl® FSO, FSN, FS-300 produced by E.I. DuPont de Nemours and Co., and 3M™ Novec™ fluorosurfactants including FC-4430, FC-4432, and FC-4434. According to one exemplary embodiment, the Novec™ nonionic fluorosurfactants may be selected due to their noted environmental benefits. More specifically there have recently been concerns about bioaccumulation of perfluorooctanyl surfactants in the environment, the building blocks of many common fluorosurfactants used in inkjet inks. However, Novec™ surfactants are polymeric nonionic fluorosurfactants based on perfluorobutane sulfonates, rather than the higher fluorocarbon chains used in other surfactants. Consequently, Novec™ FC-4432 and FC-4430 have low toxicity and do not bioconcentrate, while providing similar wetting and anti-puddling performance as the nonionic Zonyl fluorosurfactants. Additionally, as mentioned previously, combinations of the above-mentioned anionic or nonionic surfactants may be used in the present inkjet ink formulations.

In addition to the above-mentioned fluorosurfactant, a glycol ether may be provided in the present exemplary vehicle in quantities ranging from approximately 0.5% to 15.0%. According to one exemplary embodiment, the glycol ethers may be included in the vehicle formulation to serve as co-solvent wetting agents. Appropriate glycol ethers include, but are in no way limited to, ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-iso-propyl ether.

Further, as mentioned previously, the present exemplary vehicle may include between approximately 0.5% and 15.0% 1,2-alkanediols. According to one exemplary embodiment, the 1,2-alkanediols used in the wetting agent of the present exemplary vehicle may include 1,2-alkanediols such as 1,2-diols containing C4 or higher carbon chains. For example, in one exemplary embodiment, if a C4 to C8 1,2-alkanediol is selected for use in the exemplary vehicle, then 1,2-hexanediol can be used. Alternatively, according to another exemplary embodiment, Hexylene glycol and other highly wetting diols may be included in the wetting agent of the present vehicle to be used in the resulting inkjet ink.

Further, in addition to the above-mentioned components of the present exemplary vehicle, various other additives may be employed to optimize the properties of the resulting inkjet ink composition for specific applications. More specifically, examples of acceptable additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R. T. Vanderbilt Co.), Proxel (ICI America), and combinations thereof.

Further, sequestering agents, such as EDTA (ethylene diamine tetraacetic acid), may be included to eliminate the deleterious effects of heavy metal impurities, and buffer solutions may be used to control the pH of the resulting ink. According to one exemplary embodiment, from 0 wt % to 2.0 wt %, of the vehicle, for example, can include sequestering agents. Viscosity modifiers and buffers may also be present, as well as other additives known to those skilled in the art to modify properties of the ink as desired. Such additives can be present at, according to one exemplary embodiment, from 0 wt % to 20.0 wt %.

Latex Particulates

In addition to the above-mentioned ink vehicle, the present inkjet ink may include according to one exemplary embodiment, a number of latex polymer particulates in the form of a latex dispersion. While the latex particulates in the form of a latex dispersion are not necessary for the above-mentioned ink vehicle, the inclusion of the latex may increase durability of a subsequently formed image. According to one exemplary embodiment, one or more of many different types of polymer dispersions can be used in the present inkjet ink. However, latexes specifically adapted for use in ink-jet architecture are preferred. Consequently, latex particulates, such as would be present in latex paints or the like, which tend to settle and require stirring, though not outside of the present exemplary system and method, are less preferred for use.

According to one exemplary embodiment, the latex particulates included in the present inkjet ink with enhanced wetting properties includes latex particulates having surface acid groups. Specifically, latex particulates having surface acid groups tend to be more stable over longer periods of time, and tend to resist aggregation. Thus, in one exemplary embodiment, neutralized surface acid groups can be present on the latex particulates. These acid groups can be present throughout the latex particulates, including on the surfaces, or can be more concentrated at the surfaces. In a more detailed aspect, the latex particulates can be prepared using acid monomers copolymerized with other monomers to form a monomer emulsion, which in turn, is initiated to form the latex particulates. The acid functionalities are neutralized to provide a surface charge on the latex particles. In this exemplary embodiment, the acid monomers can be present at from approximately 0.5 wt % to 15 wt % of total monomers used to form the latex particulates. Typical acids that have been used to acidify the surface of latex particulates included carboxyl acids, though stronger acids can also be used. Carboxylic acids are weak acids that have been fairly effective for use in latex/ink-jet ink systems. For example, methacrylic acid functionalized latex particulates can be formed using 6 wt % methacrylic acid. During preparation, a fraction of the methacrylic acid monomers may stay in the particle phase and the balance may migrate to the aqueous phase of the emulsion.

In another exemplary embodiment, the latex particulates can be provided by multiple monomers copolymerized to form the latex particulates, wherein the multiple monomers include at least one crosslinking monomer present at from approximately 0.1 wt % to 3 wt % of total monomers used to form the latex particulates. Such a crosslinking monomer does not provide the acid groups but can provide other properties to the latex that can be desirable for ink-jet applications.

A specific example of latex particulates that can be used include those prepared using an emulsion monomer mix of various weight ratios of styrene, hexyl methacrylate, ethylene glycol dimethacrylate, and methacrylic acid, which are copolymerized to form the latex. Typically, the styrene and the hexyl methacrylate monomers can provide the bulk of the latex particulate, and the ethylene glycol dimethacrylate and methyl methacrylate can be copolymerized therewith in smaller amounts. According to this exemplary embodiment, the acid group is provided by the methacrylic acid. While the present latex particulate example is provided, other combinations of monomers can similarly be used to form latex particulates. Exemplary monomers that can be used to form latex particulates according to the present exemplary system and methods include, but are in no way limited to, styrenes, C1 to C8 alkyl methacrylates, C1 to C8 alkyl acrylates, ethylene glycol methacrylates and dimethacrylates, methacrylic acids, acrylic acids, and the like.

Ink-jet inks containing latex polymers and other latex dispersions have traditionally had issues with respect to reliable jetting. For example, latex inks often show decel, a reversible phenomena where the drop velocity across a print swath decreases over time. This can often occur to the point of inhibiting printing altogether. Once printing is stopped and started again, the initial drop velocity will recover until further printing over time occurs. A similar problem is termed freqcel, where the drop velocity (but not the drop mass) is frequency dependent.

Inks exhibiting freqcel typically have high velocity at lower firing frequencies, but also exhibit diminished or unstable drop velocity at higher firing frequencies. Both decel and freqcel result in undesirable drop placement, image quality, and nozzle reliability. These issues can be reduced using the liquid vehicle system of the present system and method.

Other aspects of the latexes of the present exemplary system and method can include properties such as desirable glass transition temperature and particulate density. For example, in one exemplary embodiment, the polymer glass transition temperature of the latex particulates used in the present exemplary system and method can be in the range of approximately −20° C. to +30° C. for inks printed at room temperature, and the latex particulates can be within a density range from approximately 0.9 to 1.1 g/cm3. These properties can be selected individually or in combination to contribute to desired ink performance relative to thermal shear stability, freqcel, decel, decap, particle settling, and co-solvent resistance. For example, according to another exemplary embodiment, the inks of the present exemplary system and method may be printed at elevated temperatures. According to this exemplary embodiment, the above properties of the latexes may be modified even further. For instance, latex particulates having higher polymer glass transition temperatures, between approximately 50° C. to 100° C., may be used at elevated temperatures.

Pigment

Continuing with the present exemplary inkjet ink, a pigment or any number of pigment blends may be provided in the inkjet ink formulation to impart color to the resulting ink. In one exemplary aspect, the pigment may be any number of desired pigments dispersed throughout the resulting inkjet ink. More particularly, the pigment included in the present inkjet ink may include, but is in no way limited to, self-dispersed (surface modified) pigments, or pigments accompanied by a dispersant.

Suitable pigments that may be included in the present inkjet ink can be black pigments, white pigments, cyan pigments, magenta pigments, yellow pigments, or the like. Further, pigments can be organic or inorganic particles as is well known in the art. Suitable inorganic pigments include, for example, carbon black. However, other inorganic pigments may be suitable such as titanium oxide, cobalt blue (CoO—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 177, Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation and Sun Chemical Corporation.

Examples of black pigments that can be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates.

Similarly, a wide variety of colored pigments can be used with the present system and method, therefore the following listing is not intended to be limiting. For example, colored pigments can be blue, brown, cyan, green, white, violet, magenta, red, orange, yellow, as well as mixtures thereof. The following color pigments are available from Cabot Corp.: CABO-JET 250C, CABO-JET 260M, and CABO-JET 270Y. The following color pigments are available from BASF Corp.: PALIOGEN Orange, PALIOGEN Orange 3040, PALIOGEN Blue L 6470, PALIOGEN Violet 5100, PALIOGEN Violet 5890, PALIOGEN Yellow 1520, PALIOGEN Yellow 1560, PALIOGEN Red 3871K, PALIOGEN Red 3340, HELIOGEN Blue L 6901F, HELIOGEN Blue NBD 7010, HELIOGEN Blue K 7090, HELIOGEN Blue L 7101F, HELIOGEN Blue L6900, L7020, HELIOGEN Blue D6840, HELIOGEN Blue D7080, HELIOGEN Green L8730, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGRALITE Rubine 4BL, IGRALITE Blue BCA, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-$O_2$, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, HOSTAPERM Orange GR, HOSTAPERM Scarlet GO, HOSTAPERM Pink E, Permanent Rubine F6B, and the HOSTAFINE series. The following pigments are available from Mobay Corp.: QUINDO Magenta, INDOFAST Brilliant Scarlet, QUINDO Red R6700, QUINDO Red R6713, and INDOFAST Violet. The following pigments are available from Sun Chemical Corp.: L74-1357 Yellow, L75-1331 Yellow, and L75-2577 Yellow. Other examples of pigments can include Normandy Magenta RD-2400, Permanent Violet VT2645, Argyle Green XP-111-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR 2673, Lithol Fast Yellow 0991 K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, and Lithol Fast Scarlet L4300. These pigments are available from commercial sources such as Hoechst Celanese Corporation, Paul Uhlich, BASF, American Hoechst, Ciba-Geigy, Aldrich, DuPont, Ugine Kuhlman of Canada, Dominion Color Company, Magruder, and Matheson. Examples of other suitable colored pigments are described in the Colour Index, 3rd edition (The Society of Dyers and Colourists, 1982).

Other pigments not specifically listed can also be suitable for attachment to the polymers based on the disclosure provided herein. The above-illustrated pigments can be used singly or in combination of two or more. Typically, the pigments of the present system and method can be from about 10 nm to about 10 μm and in one aspect can be from 10 nm to about 500 nm in diameter, although sizes outside this range can be used if the pigment can remain dispersed and provide adequate color properties. In one detailed aspect of the present system and method, the pigment can comprise from about 1% to about 20% by weight of the ink-jet ink composition, and often can comprise from about 2% to about 6% by weight of the ink-jet ink composition.

As mentioned previously, the colorants of the present exemplary system and method can further include a dispersant attached thereto. In one specific embodiment, the dispersant can include, but is in no way limited to, a carboxylic acid, however, reactive groups such as alcohol, amine, anhydride, sulfonic acid, thiol, halotriazine, maleimide and vinyl sulfone, or the like can also be used. A wide variety of dispersants are known to those skilled in the art. Non-limiting examples broad classes of suitable dispersants include polyalkyl glycols, polyalkyl imines, aryl dicarboxylic acids such as phthalic acids, isophthalic acids, terephthalic acids, carbohydrates, acrylates, methacrylates, trehalose, isomers thereof, and combinations thereof. As a general matter, glycol dispersants tend to be stable at neutral and higher pH, while imine dispersants tend to be stable at lower pH, e.g., about 4-6. In one specific embodiment, the dispersant can be polyethylene glycol. Dispersants can help to improve dispersion stability, but also can improve bleed control. Non-limiting examples of several specific suitable dispersants include polypropylene glycol, polyethylene imine, polyethylene glycol, trehalose, and combinations thereof. In some embodiments, the pigment may also have a polymer coupled thereto, the polymer being additionally coupled to a dispersant, such that the pigment is polymer-dispersed.

In an additional optional embodiment of the present system and method, the polymeric colorant can include various stabilizing additives. Such stabilizing additives can be any functional group which provides improved lightfastness, ozone fastness, steric stabilization, electrostatic stabilization, or the like. Specific non-limiting examples of suitable stabilizing additives include PEG (steric stabilization and improving solubility of certain dyes), carbohydrates (steric stabilization), polyethylene imine (electrosteric stabilization generally at acidic pH), acrylates (electrosteric stabilization generally at high pH), or the like.

Dye

According to an alternative embodiment, a dye may be provided in the inkjet ink formulation in place of, or in addition to the above-mentioned pigment, to impart color to the resulting ink. According to this exemplary embodiment, appropriate dye-based inks include, but are in no way limited to anionic dye-based inks having water-soluble acid and direct dyes.

Though any effective amount of dye can be used in the present inkjet ink formulation, the inkjet ink can comprise from approximately 0.1 wt % to 10 wt % of the dye. Examples of suitable anionic dyes include a large number of water-soluble acid and direct dyes. Specific examples of anionic dyes include the Pro-Jet series of dyes available from Avecia Ltd., including Pro-Jet Yellow I (Direct Yellow 86), Pro-Jet Magenta I (Acid Red 249), Pro-Jet Cyan I (Direct Blue 199), Pro-Jet Black I (Direct Black 168), and Pro-Jet Yellow 1-G (Direct Yellow 132); Aminyl Brilliant Red F-B (Sumitomo Chemical Co.); the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), and Duasyn Acid Blue AE-SF VP344 (Acid Blue 9); mixtures thereof; and the like. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Catodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Catodirect Yellow RL (Direct Yellow 86, Carolina Color and Chemical), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Pro-Jet 485 (a copper phthalocyanine); Magenta 377; mixtures thereof; and the like. This list is intended to be merely exemplary, and should not be considered limiting.

Exemplary Formation Method

According to one exemplary method, the above-mentioned components are selectively combined to form an inkjettable ink. Formation of the inkjettable ink begins, according to one embodiment, by first forming the pigment carrying vehicle. The vehicle is formed by combining the 1,2 alkanediol with a number of humectant co-solvents such as 2-pyrrolidone and a glycol ether such as Dowanol PnB under a stirred environment. Additionally, water followed by the fluorosurfactant may then be added to the solution to form the vehicle.

Once the vehicle is formed according to the present exemplary embodiment, the vehicle is let down into a colorant dispersion accompanied by stirring. As mentioned previously, the colorant may be any combination of pigments and/or dyes. For ease of explanation only, the present method will be described in the context of a pigment dispersion. Once sufficiently stirred, the pigment/vehicle solution may then be let down into latex(s) with accompanied stirring. The addition of the pigment/vehicle solution into the latex(s) completes formation of the inkjet ink, according to one exemplary embodiment.

Once the ink formulation is formed, as described above, the pH of the ink formulation may then be adjusted to approximately 9 with a pH adjustor such as a dilute KOH, and filtered through a Whatman GF/D or similar filters with pore sizes <2.7 um.

Once the ink-jet ink compositions are prepared, they can be placed into one or more ink-jet pens as is well known in the art. In one detailed aspect of the present exemplary system and method, an inkjet pen or other system for printing images on a substrate in accordance with the present system and method can include at least one firing chamber containing ink-jet ink compositions, respectively, to form an inkjet pen. Typical ink-jet pens can have an orifice plate having a plurality of orifices through which the ink-jet ink composition can be delivered to a substrate. According to one exemplary embodiment, the present exemplary inkjet ink formulation may be incorporated into any type of inkjet material dispenser including, but in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc. Additionally, the present inkjettable ink may be dispensed from non-inkjet sources such as, but in no way limited to, screen printing apparatuses, stamping apparatuses, pressing apparatuses, gravure printing apparatuses, and the like.

EXAMPLES

The following examples illustrate a number of embodiments of the present systems and methods that are presently known. However, it is to be understood that the following are only exemplary or illustrative of the application of the principles of the present systems and methods. Numerous modifications and alternative compositions, methods, and systems may be devised by those skilled in the art without departing from the spirit and scope of the present systems and methods. The appended claims are intended to cover such modifications and arrangements. Thus, while the present systems and methods have been described above with particularity, the following examples provide further detail in connection with what are presently deemed to be the acceptable embodiments.

Example 1

According to the present exemplary system, a number of inkjet ink formulations were prepared according to the above-mentioned exemplary methods and dispensed by an inkjet material dispenser. Table 1 below illustrates a number of the formulations generated, according to one exemplary embodiment.

TABLE 1

|  | Light Cyan | Cyan | Light Magenta | Magenta | Light Gray | Gray | Yellow |
|---|---|---|---|---|---|---|---|
| Fluorosurfactant | 0.19 | 0.19 | 0.19 | 0.19 | 0.19 | 0.19 | 0.19 |
| Ethoxylated acetylenic diol surfactant | 0.5 | 0.5 | 0.5 | 0.5 | 0.5 | 0.5 | 0.5 |

TABLE 1-continued

|  | Light Cyan | Cyan | Light Magenta | Magenta | Light Gray | Gray | Yellow |
|---|---|---|---|---|---|---|---|
| Ethoxylated Glycerol | 3 | 3 | 3 | 3 | 3 | 3 | 3 |
| 2-P | 6 | 6 | 6 | 6 | 6 | 6 | 6 |
| 1,2-Hexanediol | 4 | 4 | 4 | 4 | 4 | 4 | 4 |
| Proxel GXL | 0.15 | 0.15 | 0.15 | 0.15 | 0.15 | 0.15 | 0.15 |
| Soluble Resin | 2 | 2 | 1.5 | 0.7 | 2 | 0.7 | 0.7 |
| PR 177 |  |  | 1.5 | 4.0 |  |  |  |
| PB 15:3 | 0.75 | 2.0 |  |  | 0.5 | 0.1 |  |
| Carbon Black |  |  |  |  | 2.0 | 0.4 |  |
| PY 155 |  |  |  |  |  |  | 4.0 |
| PV23 |  |  |  |  | 0.4 | 0.1 |  |
| Water | Balance | Balance | Balance | Balance | Balance | Balance | Balance |
| Total | 100 | 100 | 100 | 100 | 100 | 100 | 100 |

As illustrated in Table 1 above, a number of inkjet ink formulations were prepared. Each inkjet ink formulation included 1,2-hexanediol, 2-pyrrolidone, Ethoxylated Glycerol, Proxel GXL, and a soluble resin, and water. Each of the various inkjet ink formulations also includes a pigment to give the inkjet formulation a desired color. Various fluorinated surfactants were then added to the ink formulations shown above in Table 1. Three fluorinated surfactants were independently added to a volume of the above-formulations and printed onto a desired substrate. The three fluorinated surfactants included Zonyl FSO, Novec 4430, and Novec 4432. After each of the above-mentioned inkjet inks was prepared, they were loaded into an inkjet pen and selectively dispensed onto a glossy porous photo media. Once dispensed onto a first and a second desired glossy porous photo media, the resulting prints were evaluated as illustrated in Table 2 below.

TABLE 2

|  |  | Glossy Media 1 | | Glossy Media 2 | |
|---|---|---|---|---|---|
| Color | Surfactant | Average Gloss | SD of Gloss | Average Gloss | SD of Gloss |
| Gray | Novec 4432 | 82 | 9 | 81 | 15 |
| Gray | Novec 4430 | 92 | 10 | 83 | 18 |
| Gray | Zonyl FSO | 99 | 15 | 89 | 21 |
| Cyan | Novec 4432 | 42 | 26 | 57 | 6 |
| Cyan | Novec 4430 | 44 | 23 | 49 | 5 |
| Cyan | Zonyl FSO | 49 | 27 | 61 | 6 |
| Light Gray | Novec 4432 | 58 | 22 | 73 | 13 |
| Light Gray | Novec 4430 | 61 | 26 | 78 | 12 |
| Light Gray | Zonyl FSO | 63 | 33 | 88 | 14 |
| Light Cyan | Novec 4432 | 35 | 22 | 55 | 8 |
| Light Cyan | Novec 4430 | 38 | 23 | 56 | 9 |
| Light Cyan | Zonyl FSO | 38 | 24 | 66 | 7 |
| Light Magenta | Novec 4432 | 74 | 6 | 67 | 7 |
| Light Magenta | Novec 4430 | 85 | 7 | 80 | 8 |
| Light Magenta | Zonyl FSO | 89 | 8 | 94 | 12 |
| Magenta | Novec 4432 | 71 | 11 | 59 | 17 |
| Magenta | Novec 4430 | 92 | 17 | 79 | 18 |
| Magenta | Zonyl FSO | 85 | 12 | 80 | 17 |
| Yellow | Novec 4432 | 41 | 3 | 37 | 6 |
| Yellow | Novec 4430 | 74 | 9 | 59 | 14 |
| Yellow | Zonyl FSO | 76 | 10 | 71 | 13 |

As illustrated in Table 2 above, each of the prepared inks were deposited onto a porous photo media and the gloss and other properties were then evaluated on printed area fills. As illustrated above, all of the inks containing the different fluorinated surfactants had similar gloss (+/−10 gloss units). Novec 4432 had lower gloss for most colors; however the gloss of all the colors, except yellow, was acceptable. Color was also examined, and there was no color difference in the various inks.

All inks have were found to have similar decap. Puddling was evaluated and none of the pens puddled.

Moreover, a number of latex-containing ink formulations were generated and then used to print on a non-porous media to evaluate the wetting effectiveness of the formulations on a non-porous media. Exemplary cyan and magenta ink formulations are illustrated below in Table 3.

TABLE 3

| Ingredient (wt %) | Ink 1 | Ink 2 | Ink 3 | Ink 4 | Ink 5 | Ink 6 |
|---|---|---|---|---|---|---|
| acrylic latex | 4.0% | 4.0% | 4.0% | 4.0% | 4.0% | 4.0% |
| pigment dispersion | 2.0% | 2.0% | 2.0% | 2.0% | 2.0% | 2.0% |
| 1,2-hexanediol | 6.0% | 6.0% | 6.0% | 6.0% | 6.0% | 6.0% |
| MPDiol | 5.0% | 5.0% | 5.0% | 5.0% | 5.0% | 5.0% |
| 2-pyrollidinone | 6.0% | 6.0% | 6.0% | 6.0% | 6.0% | 6.0% |
| Proxel GXL | 0.2% | 0.2% | 0.2% | 0.2% | 0.2% | 0.2% |
| Dowanol PnB |  |  | 2.0% | 2.0% |  | 2.0% |
| Zonyl FSO | 0.5% | 0.5% |  |  |  |  |
| Dynol 604 |  |  | 0.5% |  |  |  |
| BYK-345 |  |  |  | 0.5% | 0.5% |  |
| Tergitol 15-S-7 |  |  |  |  |  | 0.5% |
| Water | 74.3% | 76.3% | 74.3% | 74.3% | 76.3% | 74.3% |

As shown in Table 3, each of the six ink formulations includes approximately 4% acrylic latex. Once prepared, the ink formulations were loaded into a number of inkjet pens and selectively dispensed, with the aid of print zone heating, onto a non-porous media. Specifically, the prepared ink formulations were selectively dispensed on calendared vinyl with a print zone temperature of approximately 65° C. Once printed and dried, the color bleed, wetting, and coalescence characteristics of each of the ink formulations were visually evaluated and ranked with a score of 1 indicating a high presence of desired characteristics, and 5 indicating a lack of desired characteristics. The results of the optical evaluation of the six ink formulations is illustrated in Table 4 below:

TABLE 4

| Ink | Rank |
|---|---|
| 1 | 1 |
| 2 | 1.5 |
| 3 | 4 |

TABLE 4-continued

| Ink | Rank |
|---|---|
| 4 | 3 |
| 5 | 3.5 |
| 6 | 5 |

As demonstrated by the rankings of the printed inks, ink 1 and 2, which contained a fluorosurfactant (Zonyl FSO) exhibited the highest quantity of desired color bleed, wetting, and coalescence characteristics, even on the non-porous substrates. The addition of a glycol ether, Dowanol PnB, further improved the image quality. Combinations containing Dowanol PnB had increased image quality over the base inks without glycol ether.

In conclusion, the present exemplary system and method provide for an exemplary inkjet ink formulation configured to enhance the wetting properties of the ink. Additionally, the present inkjet ink formulation is configured to enhance the inkjet printing of non-porous substrates. As mentioned above, the present highly wetting formulations include relatively high concentrations of fluorosurfactant in combination with glycol ethers and 1,2-alkanediols. According to one exemplary embodiment, the fluorosurfactant includes a Novec fluorosurfactant has a low toxicity and does not bioconcentrate, while providing similar wetting and anti-puddling performance as traditional fluorosurfactants.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An inkjet ink comprising:
an ink vehicle including at least one humectant co-solvent and a wetting agent, wherein said wetting agent includes glycol ether, 1,2-alkanediols, and between approximately 0.1 and 5.0% fluorosurfactant; and a colorant in said vehicle.

2. The inkjet ink of claim 1, wherein said ink vehicle comprises:
between approximately 0.5% and 15.0% glycol ether;
between approximately 0.5% and 15.0% 1,2-alkanediols; and
between approximately 0.1% and 5.0% fluorosurfactant.

3. The inkjet ink of claim 1, wherein said humectant co-solvent comprises 2-pyrrolidone.

4. The inkjet ink of claim 1, wherein said ink comprises a surface tension of less than approximately 30 dynes/cm.

5. The inkjet ink of claim 1, wherein said fluorosurfactant comprises a fluorosurfactant based on perfluorobutane.

6. The inkjet ink of claim 5, wherein said fluorosurfactant is configured to resist bioconcentration.

7. The inkjet ink of claim 5, wherein said fluorosurfactant comprises a nonionic fluorosurfactant.

8. The inkjet ink claim of claim 1, wherein said 1,2-alkanediol comprises 1,2-hexanediol.

9. The inkjet ink of claim 1, wherein said 1,2-alkanediol comprises a C4 to a C8 1,2-alkanediol.

10. The inkjet ink of claim 1, further comprising latex particulates in said ink vehicle.

11. The inkjet ink of claim 1, wherein said colorant comprises a pigment.

12. The inkjet ink of claim 1, wherein said colorant comprises a dye.

13. A method of forming an inkjet ink comprising:
forming an ink vehicle, wherein said ink vehicle includes at least one humectant co-solvent and a wetting agent, said wetting agent including approximately 0.5% to 15.0% glycol ether, approximately 0.5% to 15.0% 1,2-alkanediols, and between approximately 0.1 and 5.0% fluorosurfactant;
introducing a colorant pigment into said ink vehicle; and
dispersing a plurality of latex particulates in said ink vehicle.

14. The method of claim 13, wherein said fluorosurfactant comprises a fluorosurfactant based on perfluorobutane configured to resist bioconcentration.

15. The method of claim 13, wherein said forming an ink vehicle further comprises combining water with said humectant co-solvents and said wetting agent to form said ink vehicle.

16. The method of claim 13, further comprising adjusting a pH of said inkjet ink to approximately 9.

17. The method of claim 13, further comprising filtering said inkjet ink through a filter to substantially remove particles having a diameter larger than approximately 2.7 µm.

18. The method of claim 17, further comprising filling an inkjet material dispenser with said filtered inkjet ink.

19. A method of inkjet printing an image, comprising:
selectively dispensing an inkjet ink onto a substrate with an inkjet material dispenser;
wherein said inkjet ink includes an ink vehicle including at least one humectant co-solvent and a wetting agent, said wetting agent including glycol ether, 1,2-alkanediols, and between approximately 0.1 and 5.0% fluorosurfactant, latex particulates dispersed in said ink vehicle, and a colorant in said vehicle.

20. The method of claim 19, wherein said ink vehicle comprises:
between approximately 0.5% and 15.0% glycol ether;
between approximately 0.5% and 15.0% 1,2-alkanediols; and
between approximately 0.1% and 5.0% fluorosurfactant.

21. The method of claim 19, wherein said fluorosurfactant comprises a fluorosurfactant based on perfluorobutane configured to resist bioconcentration.

22. The method of claim 19, wherein said substrate comprises a non-porous substrate.

23. The method of claim 19, wherein said inkjet material dispenser comprises one of a thermally actuated inkjet dispenser, a mechanically actuated inkjet dispenser, an electrostatically actuated inkjet dispenser, a magnetically actuated dispenser, a piezoelectrically actuated dispenser, or a continuous inkjet dispenser.

24. A system for printing an inkjet ink comprising:
an inkjet ink including:
an ink vehicle including at least one humectant co-solvent and a wetting agent, wherein said wetting agent includes glycol ether, 1,2-alkanediols, and a fluorosurfactant; and
a colorant in said vehicle; and
an inkjet material dispenser fluidly coupled to said inkjet ink, said inkjet material dispenser being configured to selectively dispense said inkjet ink onto a desired substrate.

25. The system of claim 24, wherein said inkjet material dispenser comprises one of a thermally actuated inkjet dispenser, a mechanically actuated inkjet dispenser, an electrostatically actuated inkjet dispenser, a magnetically actuated dispenser, a piezoelectrically actuated dispenser, or a continuous inkjet dispenser.

26. The system of claim 24, wherein said ink vehicle comprises:
   between approximately 0.5% and 15.0% glycol ether;
   between approximately 0.5% and 15.0% 1,2-alkanediols; and
   between approximately 0.1% and 5.0% fluorosurfactant.

27. The system of claim 24, further comprising a non-porous substrate configured to receive said inkjet ink.

28. The system of claim 24, wherein said humectant co-solvent comprises 2-pyrrolidone.

29. The system of claim 24, wherein said ink comprises a surface tension of less than approximately 30 dynes/cm.

30. The system of claim 24, wherein said fluorosurfactant comprises a fluorosurfactant based on perfluorobutane configured to resist bioconcentration.

31. The system of claim 24, wherein said 1,2-alkanediol comprises 1,2-hexanediol.

32. The system of claim 24, wherein said 1,2-alkanediol comprises a C4 to a C8 1,2-alkanediol.

33. The system of claim 24, further comprising a plurality of latex particulates dispersed in said ink vehicle, said latex particulates including neutralized surface acid groups.

* * * * *

UNITED STATES PATENT AND TRADEMARK OFFICE
CERTIFICATE OF CORRECTION

PATENT NO. : 7,696,262 B2  Page 1 of 1
APPLICATION NO. : 11/202817
DATED : April 13, 2010
INVENTOR(S) : Phillip C. Cagle et al.

It is certified that error appears in the above-identified patent and that said Letters Patent is hereby corrected as shown below:

In column 15, line 27, after "fluorosurfactant" insert -- that --.

Signed and Sealed this
Twenty-second Day of March, 2011

David J. Kappos
*Director of the United States Patent and Trademark Office*